No. 798,983. PATENTED SEPT. 5, 1905.
C. SHABLEY.
HARROW.
APPLICATION FILED DEC. 22, 1904.
2 SHEETS—SHEET 1.
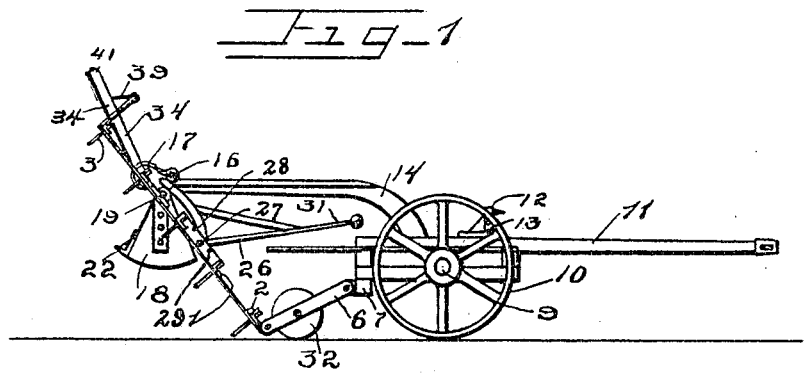
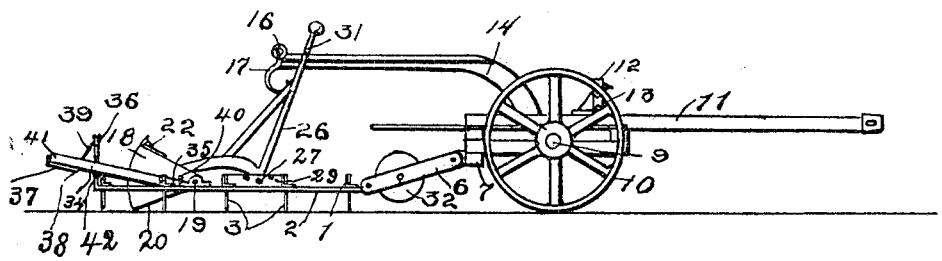
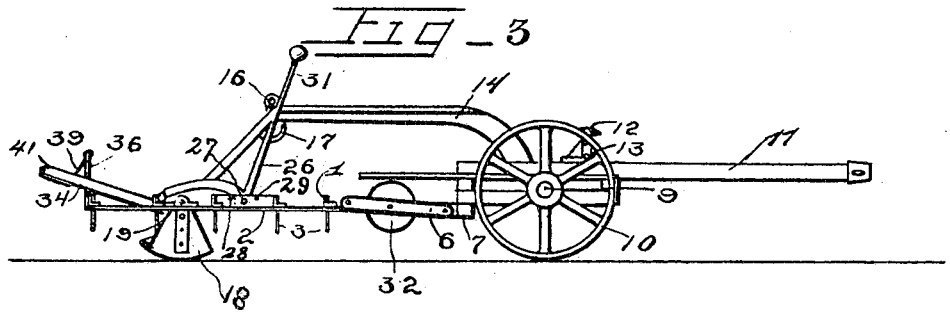

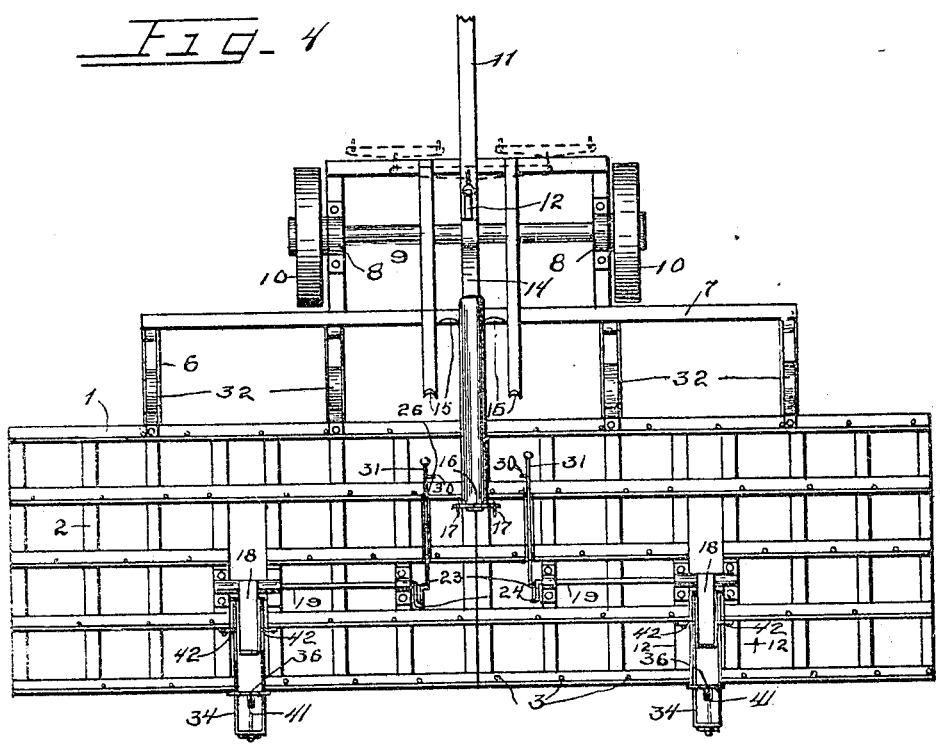
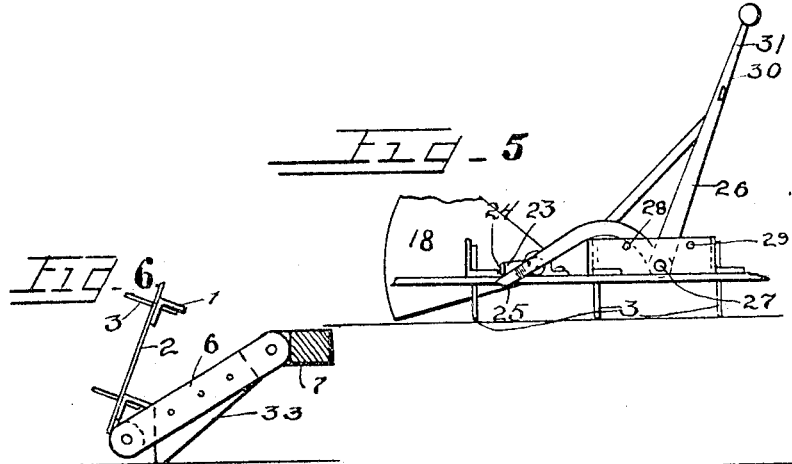

UNITED STATES PATENT OFFICE.

CHARLES SHABLEY, OF WESSINGTON SPRINGS, SOUTH DAKOTA.

HARROW.

No. 798,983. Specification of Letters Patent. Patented Sept. 5, 1905.

Application filed December 22, 1904. Serial No. 237,875.

*To all whom it may concern:*

Be it known that I, CHARLES SHABLEY, a citizen of the United States of America, and a resident of Wessington Springs, Jerauld county, South Dakota, have invented certain new and useful Improvements in Harrows, of which the following is a specification.

My invention relates to harrows involving the use of a wheeled frame or truck to be guided and drawn by draft-animals, harrow-sections dragged in rear of the truck when in operation and connected with the truck by devices permitting them to rise bodily or to swing upward by rotation about an axis near their front sides, the object being to provide a harrow of unusually light draft that shall embody many advantages not found in most harrows and which will hereinafter appear more clearly.

In the accompanying drawings, Figure 1 shows the apparatus in side elevation, the harrow being swung up as in passing from place to place or from field to field. Fig. 2 shows the same devices, the harrow being in working position. Fig. 3 shows the same apparatus, the harrow being raised bodily but kept nearly in a horizontal plane. Fig. 4 is a plan view of the same apparatus. Figs. 5 and 6 are detail views.

In the views, 12 represents a harrow having *per se* no novelty herein claimed but made in two sections. These sections are not directly connected, but are independently connected to the rear laterally-projecting transverse member, 7 of a truck-frame 8, bearing an axle 9 and supported by wheels 10. The truck is guided by the usual pole 11, which bears a block 12, provided with holes 13, for the attachment of the usual whiffletree or doubletree. The truck, which is narrow in comparison with the width of the harrow-sections, is provided with a rearwardly-extending seat-beam 14 and foot-rests 15, and at the rear end of the beam is a block 16, carrying hooks 17 to engage and support the rear side of the harrow-sections when the same has been raised for moving from place to place. The beam is long and is so formed that the driver may conveniently seat himself upon it at any convenient distance from the front of the truck.

Each section is connected to the truck member 7 by links or clevises 6, which have their rear and front ends hinged to the harrow-section and to the member 7, respectively, in such manner as to permit free vertical movement, but practically no lateral displacement, and hence the sections may rise and fall independently with no danger of riding the one upon the other.

For raising the sections bodily to discharge trash or rubbish sector-like blocks 18 are mounted near the middle of each section on rotary shafts 19. These blocks ordinarily drag in the rear of their shafts with their lower sides 20 in contact with the ground, but they may at will be thrown over to the front of their shafts, where they engage the ground, and then roll forward, the sections riding up and the shafts passing over to the front of the blocks, which are thus brought again to their normal positions in the rear of their shafts.

The blocks, their action, and the result are all old; but in this case they may be actuated by devices operated from the driver's seat and used also to swing the harrow upward for moving from field to field. To thus actuate the block of either section, I provide a bell-crank lever 26, pivoted at 27 on the harrow-section near its front side, having one arm extended rearward to engage a crank 24 upon the shaft 19, the engaging parts 23 25 being beveled in such manner that one springs past the other when moving in one direction, but not when the lever tends to impel the block upwardly forward. The opposite end of the bell-crank lever lies within easy reach of the driver's seat, and its handle portion 31 may telescope with the body portion 26 to give such variation in length as may be desired. If this lever be forced down upon the stop 29, further movement swings the section upward about the pivots at the rear ends of the corresponding links 6, the links themselves swinging downward slightly about the pivots at their front ends, and when the proper height has been reached the rear side of the section may be secured by means of the hooks 17, which are also within reach of the driver. The main portion of the lever has upon its sides projections 30, whereby the driver may actuate it with his feet. When the links swing downward at their rear ends, as just described, they transmit to the ground a part at least of the weight of the section, and that they may slide over the ground without injury while doing this they are provided with wheels 32, Fig. 2, or non-rotary projections 33, Fig. 6, which at such times rest upon the ground and normally lie above it. The blocks 18 may also be thrown over to the front of their shafts by means of levers 34, fulcrumed on the harrow members, though lying loosely in slots in brackets 36 upon the harrow-sections, respectively, and in position to engage suitable projections upon the corresponding blocks. Each lever 34 has at its rear end a spring-arm 37, attached at 38 to a link 39, pivotally connected to the upper part of the bracket 36. The operator by pressing downward with his foot at 41 causes the lever to swing about its fulcrum 42, whereby its free end 35 engages the pin 40 upon the block 18 and throws the block over to the front side of its pivotal axis. No claim is herein made to this mechanism for actuating the block from the rear of the harrow.

What I claim is—

1. The combination with a wheeled frame or truck provided with a rider's seat, of a harrow hinged to the rear side of the frame to swing vertically, a segmental block revolubly mounted in the harrow and adapted to lift the same bodily when it is revolved, and means whereby the rider may at will cause the revolution of the block without moving from his seat.

2. In a riding-harrow, the combination with a harrow-section having teeth and hinged at its front side to swing vertically, a segmental block mounted upon said section and adapted to lift the section when in revolving, a lever pivoted to the section and extending within reach of the rider's seat, and arranged to impart rotary impulse to the block and a stop arranged to limit the swing of the lever upon its pivot, substantially as set forth.

3. In a riding-harrow, the combination with a harrow-section hinged to swing vertically about its own front side, of a seat for the driver, a segmental block trailing from a pivotal support on said section and adapted to roll beneath its pivot when thrown in front of the latter, thus raising the section bodily, and a lever pivoted to the harrow-section, extending within reach of the driver's seat, and arranged for throwing the block to the front of its pivot.

4. The combination with a truck, of a harrow-section hinged to the rear side of the truck, a driver's seat, an eccentric block pivoted to the section, normally trailing from its pivot, and adapted to lift the section when thrown to the front of said pivot and rotated upon the same, and a lever pivoted to the section, operable from the driver's seat, and arranged to first impart rotary impulse to the block and then swing the section upon its hinge when pushed in the proper direction by the driver.

5. The combination with a truck, of a harrow-section in the rear of the truck, links pivoted in front to the trunk and at the rear to said section and adapted to ride upon the ground when their rear ends are depressed, and means for supporting the rear side of the section from the truck when that side has been raised to the proper height.

6. The combination with a truck, of harrow-sections in the rear of the truck, flexible connections independently connecting the sections to the truck, eccentric blocks mounted in the sections, respectively, and adapted to revolve and lift the sections, and means for at will causing either block to revolve, said means being operable from the driver's seat.

7. The combination with the truck having the relatively long transverse rear member and the rearwardly-extending seat-beam, of the harrow-sections independent of each other, the links connecting the sections to said rear member, levers for swinging the sections upward, and means for securing the rear sides of the raised sections to said seat-beam.

Signed at Chicago this 17th day of December, 1904.

CHARLES SHABLEY.

Witnesses:
W. A. SHEAHAN,
LEON A. BEACH.